United States Patent [19]

Britton et al.

[11] Patent Number: 4,494,738
[45] Date of Patent: Jan. 22, 1985

[54] SHOCK-ABSORBING JOINT AND ASSEMBLY WITH ROTATING ARMS AND ELASTOMERIC SPRING ACTION

[75] Inventors: Frederick G. Britton; Thomas A. Clark, both of Arlington, Tex.

[73] Assignee: Oil States Industries, Inc., Arlington, Tex.

[21] Appl. No.: 356,219

[22] Filed: Mar. 8, 1982

[51] Int. Cl.³ .................................................. F16F 7/12
[52] U.S. Cl. ............................ 267/140; 267/57.1 R; 267/141; 293/136; 405/212
[58] Field of Search ................................ 405/212–216; 114/219, 220; 267/57.1 R, 57.1 A, 63 R, 63 A, 139–140, 140.4, 140.5, 140.3, 141, 116, 141.1, 141.2–141.7, 154, 153; 293/155, 136, 131, 154; 403/52–54, 120

[56] References Cited

U.S. PATENT DOCUMENTS

| | | | |
|---|---|---|---|
| 2,907,281 | 10/1959 | Moulton et al. | 267/57.1 R X |
| 3,795,392 | 3/1974 | Nemec | 267/140 |
| 3,988,013 | 10/1976 | Von Bose | 267/116 |
| 3,991,582 | 11/1976 | Waldrop et al. | 405/213 |
| 4,084,801 | 4/1978 | Landers et al. | 267/140 |
| 4,098,211 | 7/1978 | Files et al. | 114/219 |
| 4,109,474 | 8/1978 | Files et al. | 405/215 |
| 4,363,474 | 12/1982 | Leblanc et al. | 267/140 |
| 4,408,931 | 10/1983 | Leblanc et al. | 114/219 X |

FOREIGN PATENT DOCUMENTS 701969  1/1931  France ........................... 267/57.1 R Primary Examiner—Douglas C. Butler
Attorney, Agent, or Firm—Arnold, White & Durkee

[57] ABSTRACT

A shock-absorbing joint absorbs shock forces by distortion of elastomeric material under torque. One form of the shock-absorbing joint has an inner cylinder fitting within an outer cylinder so as to extend longitudinally beyond each end of the outer cylinder and provide an annular space between the cylinders. A body of elastomeric material, such as rubber, fills the annular space and is affixed to the inside surface of the outer cylinder and the outside surface of the inner cylinder. Inner and outer cylinder pivot members are affixed to the inner and outer cylinder, respectively, and are perpendicular to the common pivot axis of the cylinders. Two or three of such shock-absorbing joints may be used to form a shock-absorbing assembly that is particularly useful in protecting marine platforms.

12 Claims, 11 Drawing Figures

U.S. Patent Jan. 22, 1985 Sheet 1 of 3 4,494,738
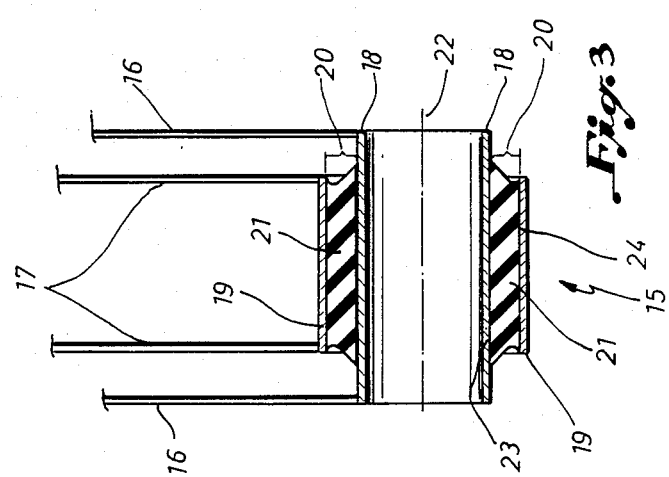
Fig. 3
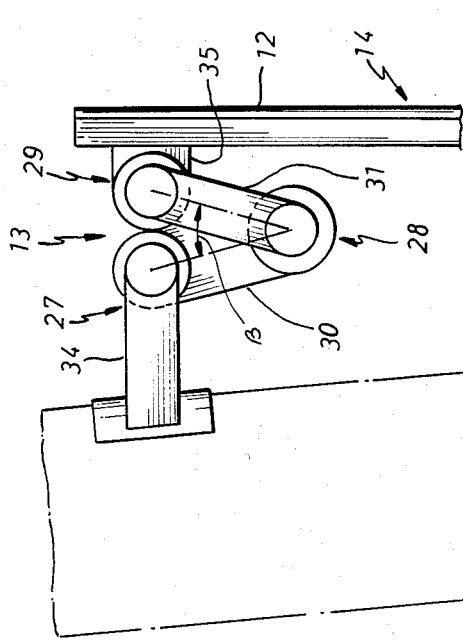
Fig. 2
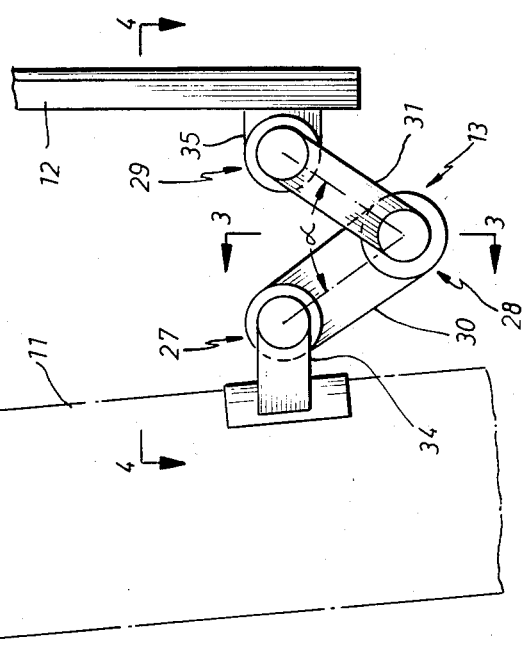
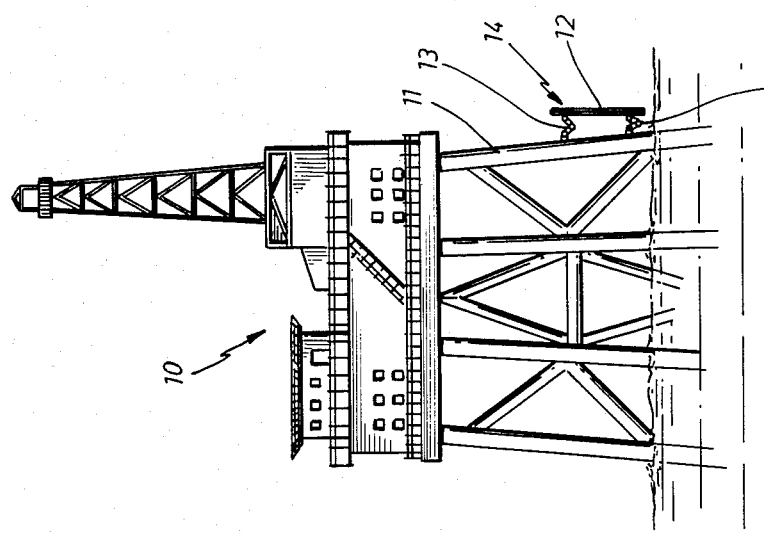
Fig. 1

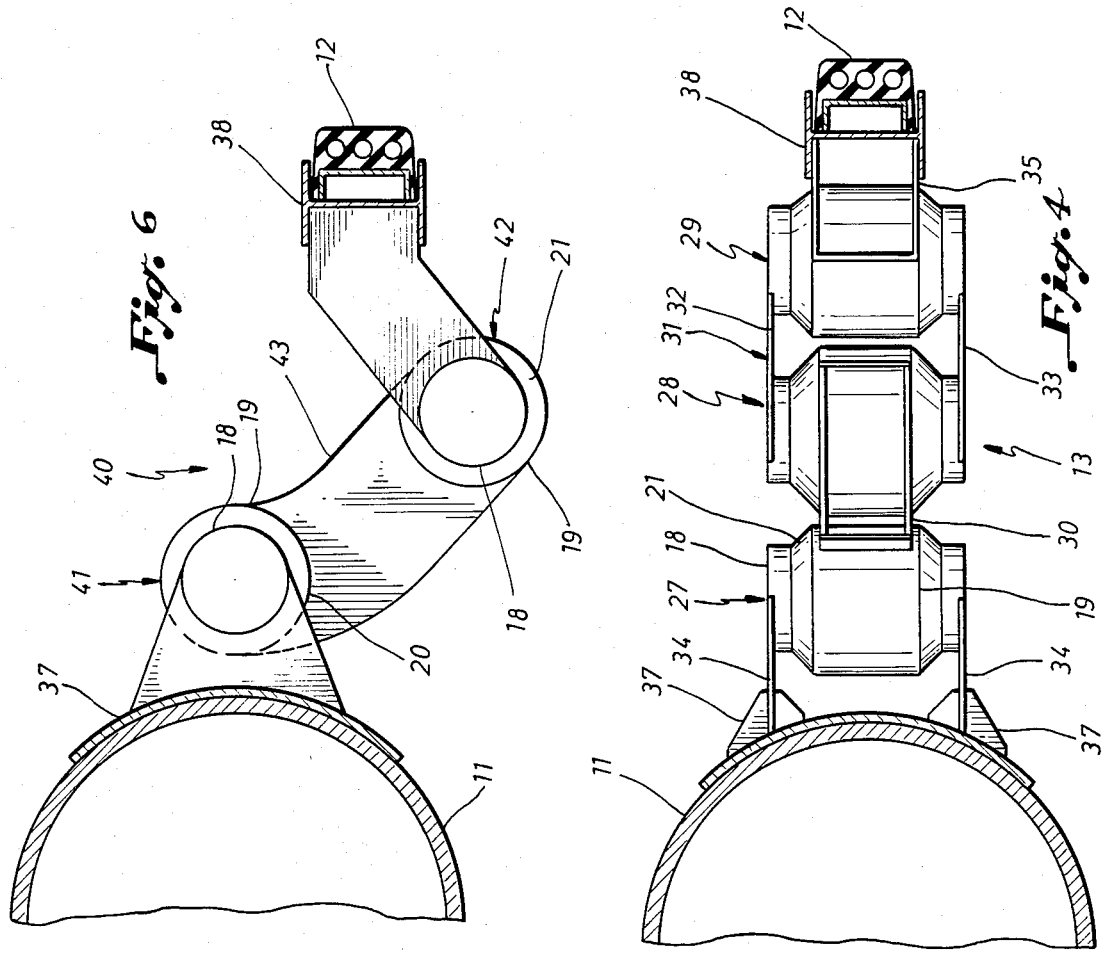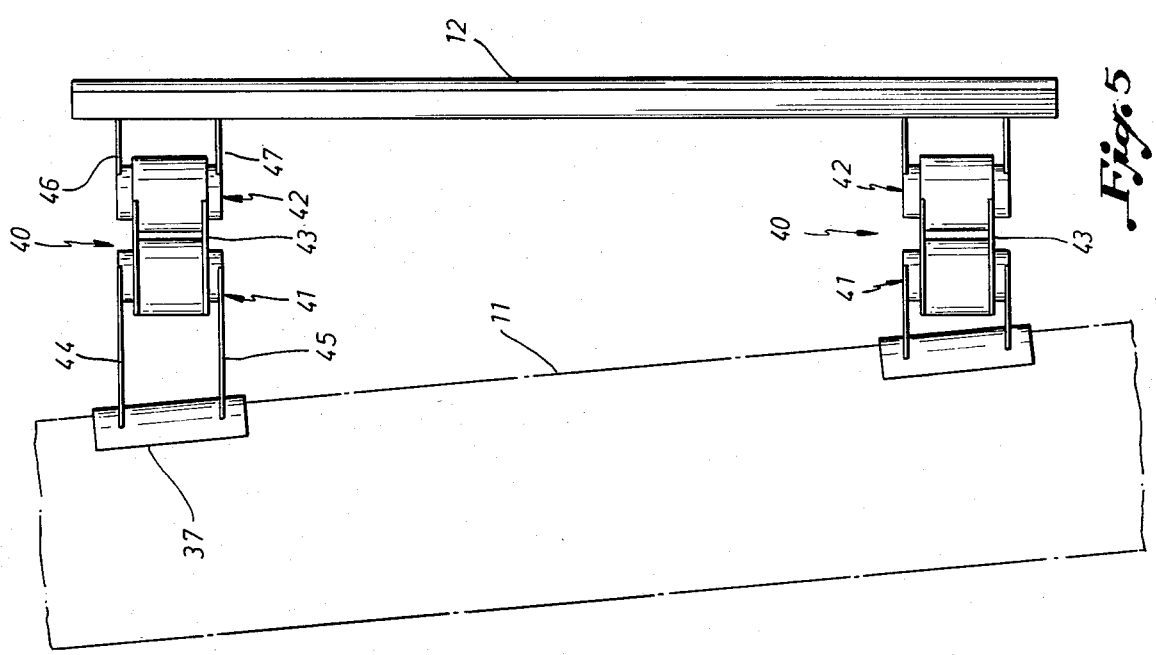

SHOCK-ABSORBING JOINT AND ASSEMBLY WITH ROTATING ARMS AND ELASTOMERIC SPRING ACTION

BACKGROUND OF THE INVENTION

This invention relates generally to shock-absorbing devices. The invention is particularly directed to a novel shock-absorbing joint and shock-absorbing assembly that absorb shock forces by distortion of elastomeric material under torque. The elastomeric material absorbs rotational shear forces resulting from such torque and by elastomeric spring action returns each joint, and thus the whole shock-absorbing assembly, to an original unloaded position.

The present invention is believed to be of greatest value as a shock-absorber for a dock or marine platform. The shock-absorbing joint and assembly of the present invention is, however, not limited to use in the marine environment. The present invention can be used to reduce the impact force between any two objects with sudden shock forces one against the other.

Shock-absorbing devices, such as bumpers, shock cells, and other cushioning devices, have been used for some time to protect offshore production and drilling platforms and marine vessels in the vicinity of such platforms. Similar devices have been used on docks and berths to protect both the dock and the vessel approaching the dock from damage that might result from sudden and forceful contact between the two. Generally, shock-absorbing devices are used to cushion the impact of vessels striking docks, offshore platforms, and the like. In the absence of such shock-absorbing devices, the uncushioned full shock load of a vessel against the structure of a platform or dock may damage or weaken such structure.

One particular device for use as a dock shock-absorber between an approaching ship and the dock is the shock-absorber assembly described in U.S. Pat. No. 3,988,013 to Von Bose. This patent describes a device employing a hydraulic cylinder, the stroke of which is amplified by a system of levers. The principal disadvantages associated with the use of any shock-absorbing device employing a hydraulic cylinder as its principal operating structure arise from the number of moving mechanical parts involved. In the highly corrosive marine environment, the principle handicap of mechanical shock mitigation devices is that of susceptibility to corrosion. One attempted solution to this problem is the additional expense of providing specially bonded seals for complete environmental protection, such as that described in the Von Bose patent.

It has also been known in the prior art for some time to use rubber or other elastomeric material in compression, shear, or both, to absorb docking impact and similar impact forces between docks or platforms and floating vessels. Regardless of the particular configuration employed, the functioning of such devices using rubber or similar materials relies upon the transformation of the momentum of the ship into molecular distortion forces within the elastomeric material.

One particular type of device that has been used in shock-absorbing marine fenders can best be referred to as an axial shock load absorbing cell. This particular type of shock cell is disclosed in U.S. Pat. Nos. 4,098,211 and 4,109,474 to Files et al. and in U.S. Pat. No. 3,991,582 to Waldrop et al. In the typical axial load cell disclosed in each of these three patents, elastomeric material is bonded between two different diameter cylinders. Upon receiving a shock load, the smaller diameter cylinder is made to move longitudinally relative to the larger diameter cylinder so as to work the rubber or other elastomeric material in a shear stress.

Another embodiment for axial load cells is that disclosed in U.S Pat. No. 4 084,801 to Landers et al. Prior to the invention described in the Landers patent, the typical axial load cell was produced in a one-step molding process wherein the rubber or other elastomeric material was molded in place between the two different diameter cylinders. The Landers patent provided some insight into coping with problems arising from shrinkage of the molded elastomeric material and the concomitant breaking of bonds of the elastomeric material from the cylinders. This improvement was essentially accomplished by providing for a plurality of molded and bonded segments within the annular space between the two cylinders of a given load cell.

There remain, however, significant design problems with the axial load cells of the type described in the Landers patent. For example, there remains the problem of more stress on the bond between elastomeric material and a cylinder than on the elastomeric material itself within the typical axial load cell. This is due in part to the discontinuity during shear stress at the extremities of the body of elastomeric material within an axial load cell. Other more fundamental disadvantages also exist for the axial load cells. The typical axial load cell has a very narrow range of variable design characteristics. The typical axial load cell has a relatively short stroke and a high spring rate. In the operation of such an axial load cell, the cell must have a long enough stroke at an appropriate spring rate so that the energy (which is primarily a function of vessel displacement and approach velocity) is absorbed before the load limit of the structure is reached. In order to increase the energy absorbing capacity of an axial load cell without increasing the reaction loads requires that the stroke of the axial cell be extended (and thus the spring rate lowered). There are, however, limited means available for lowering the spring rate of an axial load cell. If the axial length of the elastomeric material is reduced, the annular space must eventually be decreased, thus causing the spring rate to increase. The choice of spring rates is therefore critically limited in the use of axial load cells.

The shock-absorbing joint of the present invention overcomes many of these fundamental disadvantages of the axial load cell described above. Basically, the shock-absorbing joint with rotating arms of the present invention provides for a much more energy efficient shock-absorbing device, i.e., a higher energy absorbing system using the same amount of rubber is realized.

The shock-absorbing joint of the present invention also provides much greater flexibility in design. The shock-absorbing joints can be incorporated into an overall shock-absorbing assembly with articulating arms that can be made to move in either a vertical or horizontal plane. This feature provides additional design flexibility by accommodating those circumstances where the approaching vessels have significant vertical factors in the forces they bring to the structure being protected. In addition, the properties of the shock-absorbing joint of the present invention allow much more freedom in choosing the effective load versus the deflection characteristics of a shock-absorbing assembly. The number and size of joints are determined by the total energy absorption requirements both with respect to the magnitude and direction of the expected shock forces.

Because the joint of the present invention provides for working the elastomeric material under torque, each shock-absorbing joint will have a characteristic energy absorption capacity and spring rate. The spring rate may be defined as the moment developed per degree of rotation. The joints each have pivoting members or arms which convert the linear motion of the vessel to rotational motion about the joint. The effective spring rate is inversely proportional to the arm length. The arm length may thus be chosen to give the desired force level at maximum stroke. The effective spring rate and maximum force can be decreased to any level required by merely increasing the arm length, subject only to physical limitations as to the size of the overall shock-absorbing assembly. Thus, by adjusting the length of the articulating arms, the distance over which the movement of the vessel is stopped is increased, but the torque in the rubber remains the same.

The present invention allows for greater energy absorbing capacity per unit rubber. With the type of shear experienced by the rubber in the joint of the present invention, i.e., under torque, applicants anticipate that the shear can be as high as 400% as compared to a maximum of 200% for the typical axial load cell. Further, because of the particular shear line realized when distorting the elastomeric material under torque, the problem with bond fatigue present in axial load cells is essentially eliminated. This elimination of bond fatigue is realized because, unlike axial load cells, the joints of the present invention have no exposed corners where shear forces cause the pulling of the elastomeric material away from the surface to which it is bonded.

SUMMARY OF THE INVENTION

In the broadest sense, a shock-absorbing joint of the invention intended to incorporate the foregoing features and advantages comprises a first pivot member and a second pivot member forming an unloaded angle with the first pivot member. The first and second pivot members are rotatable relative to each other by pivoting about a common pivot axis formed by the unloaded angle. Each pivot member has a mounting base rigidly affixed thereto. The first and second mounting bases are rotatable relative to each other about the common pivot axis. A body of elastomeric material is bonded to symmetrical surfaces of the first and second mounting bases. A shock force received by one of the pivot members causes rotation of that pivot member relative to the other to form a loaded angle between the pivot member smaller than the unloaded angle. This rotation of the pivot members causes the elastomeric material to be distorted by torque and to store temporarily the rotational shear force resulting from the torque. Then by elastomeric spring action, the stored rotational shear forces are unloaded, and the first and second pivot members are returned to their original relative position with the unloaded angle therebetween.

In one particular embodiment of the shock-absorbing joint of the present invention, the first and second mounting bases are, respectively, an inner and an outer cylinder, each with the common pivot axis as its axis. The inner cylinder fits within the outer cylinder and extends longitudinally beyond each end of the outer cylinder to provide an annular space between the inner and outer cylinder. The body of elastomeric material substantially fills the annular space and is bonded to the inside surface of the outer cylinder and the outside surface of the inner cylinder. Alternatively, the body of elastomeric material may comprise a plurality of individual blocks of elastomeric material, opposite surfaces of which are bonded to curved plates, which plates are in turn rigidly affixed to the inside surface of the outer cylinder and the outside surface of the inner cylinder. Each individual block of elastomeric material may have one surface bonded directly to the outside surface of the inner cylinder and have the opposite surface bonded to a curved plate which in turn is rigidly affixed to the inside surface of the outer cylinder. Regardless of the configuration whereby the body of elastomeric material fills the annular space, an inner cylinder pivot member and an outer cylinder pivot member are rigidly affixed to the inner and outer cylinder, respectively, and are substantially perpendicular to the common pivot axis.

The shock-absorbing joint of the inner and outer cylinder embodiment may be used in any suitable fashion to absorb shock forces. For example, a shock-absorbing assembly may comprise a first and a second shock-absorbing joint as described above. The outer cylinder pivot member of the first shock-absorbing joint and the outer cylinder pivot member of the second shock-absorbing joint may form a common articulating arm linking the first and second shock-absorbing joints. The inner cylinder pivot members of the first and second shock-absorbsing joints may each have a first plate rigidly affixed to one end of the respective inner cylinder and a second plate rigidly affixed to the opposite end of the respective inner cylinder, so as to permit the unobstructed rotation of the articulating arm relative to the inner cylinder pivot members of the first and second shock-absorbing joints. The inner cylinder pivot member of the first shock-absorbing joint may be further adapted for rigidly mounting to a structure to be protected by the shock-absorbing assembly. The inner cylinder pivot member of the second shock-absorbing joint may be further adapted for rigidly affixing a bumper assembly thereto. This particular embodiment would best function by movement of the articulating arm in a horizontal plane when absorbing shock loads.

In another embodiment a shock-absorbing assembly may comprise a first, second and third shock-absorbing joint as described above. The outer cylinder pivot member of the first shock-absorbing joint and the outer cylinder pivot of the second shock-absorbing joint may form a common articulating arm linking the first and second shock-absorbing joints. The inner cylinder pivot member of the second shock-absorbing joint and the inner cylinder pivot member of the third shock-absorbing joint may form a common second articulating arm linking the second and third shock-absorbing joints. To permit unobstructed rotation of the second articulating arm relative to the first articulating arm in absorbing shock loads, the second articulating arm would have a first plate with one extremity rigidly affixed to one end of the inner cylinder of the second shock-absorbing joint and its other extremity rigidly affixed to one end of the inner cylinder of the third shock-absorbing joint and a second plate with one extremity rigidly affixed to the opposite end of the inner cylinder of the second shock-absorbing joint and its other extremity rigidly affixed to the opposite end of the inner cylinder of the third shock-absorbing joint. The inner cylinder pivot member of the first shock-absorbing joint may be further adapted for rigidly mounting to a protected structure.

The outer cylinder pivot member of the third shock-absorbing joint may be further adapted for rigidly affixing a bumper assembly thereto. This particular embodiment of the shock-absorbing assembly of the present invention is best employed so that the first and second articulating arms move in a vertical plane when the shock-absorbing assembly is absorbing shock loads.

The shock-absorbing joint of the present invention may take other forms. One particularly advantageous alternate embodiment comprises an inner pivot plate as the first pivot member and a pair of outer pivot plate substantially parallel and equidistant from the inner pivot plate on opposite sides thereof as the second pivot member. In this particular embodiment the first mounting base includes a pivot support shaft with the common pivot axis as its axis. The pivot support shaft is rigidly affixed to and passes through the inner pivot plate at the approximate longitudinal midpoint of the pivot support shaft. The first mounting base also includes an inner pair of circular slanted bonding surfaces, one rigidly affixed to each side of the inner pivot plate. The second mounting base in this embodiment includes an outer pair of circular slanted bonded surfaces, one rigidly affixed to the inside face of each of the outer pivot plates, the pivot support shaft passing through the outer pair of circular slanted bonding surfaces and the pair of outer pivot plates but not being attached to either. The body of elastomeric material substantially fills the two annular spaces each formed by a bonding surface of the inner pair of circular slanted bonding surfaces and the corresponding bonding surface of the outer pair of circular slanted bonding surfaces nearer thereto. Alternately, the pivot support shaft may be rigidly affixed to the outer pivot plates and pass through the inner pivot plate but not be attached thereto.

Examples of the more important features of this invention have been summarized rather broadly in order that the detailed description thereof that follows may be better understood and in order that the contribution to the art may be better appreciated. There are, of course additional features of the invention that will be described hereinafter and which will also form the subject of the claims appended hereto.

BRIEF DESCRIPTION OF THE DRAWING

FIG. 1 represents an elevational view of a typical offshore platform with a shock-absorbing assembly of the present invention mounted thereon.

FIG. 2 is an elevational view of a fender system incorporating two shock-absorbing assemblies of one embodiment of the present invention mounted on an offshore platform. One of the shock-absorbing assemblies depicted is shown in the unloaded state and the other is shown in the loaded state.

FIG. 3 is a detailed elevational view of a shock-absorbing joint of the present invention taken along line 3—3 of FIG. 2.

FIG. 4 is a plan view of the unloaded shock-absorbing assembly of FIG. 2 taken along cross-section line 4—4.

FIG. 5 is a side elevational view of a fender system incorporating two shock-absorbing assemblies of an alternate embodiment of the present invention.

FIG. 6 is a plan view of one of the shock-absorbing assemblies used in the fendering system of FIG. 5.

DETAILED DESCRIPTION OF THE PREFERRED EMBODIMENTS

Figure 9:
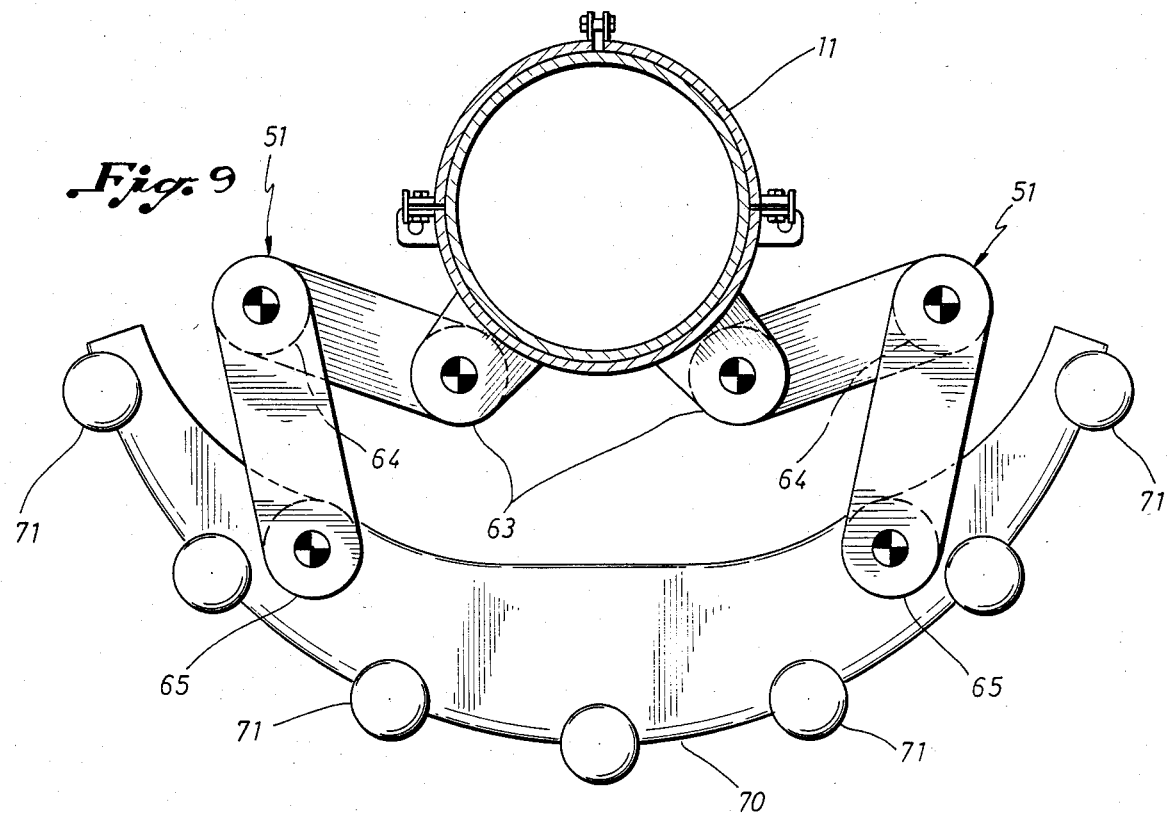
FIG. 9 is a plan view of a complete fendering system incorporating two shock-absorbing assemblies as depicted in FIG. 8.

As depicted in FIG. 1, two shock-absorbing assemblies 13 of the present invention are depicted as they would be typically used to cushion shock forces received by platform leg 11 on offshore platform 10 from floating vessels that may come close enough to the platform leg 11 to contact the offshore platform 10. The overall fendering system would typically include some type of bumper element 12, which as shown in FIG. 1 is joined to platform leg 11 by two substantially identical shock-absorbing assemblies 13.

FIG. 2 shows a more detailed close up view of the overall fender system 14. One shock-absorbing assembly 13 is shown in the maximum loaded state and the other shock absorbing assembly 13 is shown in an unloaded state. Each of the individual shock-absorbing joints that comprise the shock-absorbing assembly 13 are substantially identical and the details of each such joint are depicted by the cross-sectional view shown in FIG. 3.

A shock-absorbing joint of the present invention, in its broadest aspect, comprises a first and a second pivot member forming an unloaded angle with one pivot member being rotatable relative to the other by pivoting about a common pivot axis formed by the unloaded angle. For example in the unloaded shock-absorbing assembly 13 of FIG. 2, angle $\alpha$ represents the unloaded angle between the first and second pivot members of the second joint 28 of the shock-absorbing assembly. The unloaded shock-absorbing assembly 13 also depicted in FIG. 2 shows angle $\beta$ as the loaded angle between the first and second pivot members of the second joint 28 of the shock-absorbing assembly 13.

Also in its broadest sense, a shock-absorbing joint of the present invention will have a first and a second mounting base rigidly affixed to the first and the second pivot member respectively, so that the first and second mounting bases are rotatable relative to each other about the common pivot axis. As can be seen from the detail of FIG. 3, the first and second mounting base for the particular embodiment of the shock-absorbing joint depicted therein, are an inner cylinder 18 and an outer cylinder 19 greater in diameter than inner cylinder 18. A body of elastomeric material is bonded to the symmetrical surfaces of the first and second mounting bases so that a shock force received by one of the pivot members causes rotation of that pivot member relative to the other to form a loaded angle $\beta$ between the pivot member smaller than the unloaded angle $\alpha$. This rotation causes the elastomeric material to be distorted by torque and to absorb rotational shear force resulting from the torque by elastomeric spring action returning the first and second pivot members to their relative position with the unloaded angle therebetween.

In the particular embodiment of the shock-absorbing joint 15 depicted in FIG. 3, the first and second mounting bases are, respectively, inner cylinder 18 and outer cylinder 19, as noted above. Each cylinder has the common pivot axis as its axis and inner cylinder 18 fits within outer cylinder 19 so as to extend longitudinally beyond each end of outer cylinder 19, thus providing an annular space 20 between inner cylinder 18 and outer cylinder 19. The body of elastomeric material 21 fills the annular space 20 and is bonded to the inside surface 23 of the outer cylinder and the outside surface 24 of the inner cylinder. The first and second pivot members are, respectively, an inner cylinder pivot member 16 and an outer cylinder pivot member 17 which are substantially perpendicular to the common pivot axis 22 and are rigidly affixed to the inner cylinder 18 and outer cylinder 19, respectively. As can be seen in the detail of FIG. 3, when either the inner cylinder pivot member 16 or the outer cylinder pivot member 17 of the shock-absorbing joint 15 is subject to a shock force, the pivot members rotate relative to one another about, on pivot axis 22 which causes the body of elastomeric material 21 to be distorted by torque. The configuration of the shock-absorbing joint 15 in FIG. 3 is such that there are no discontinuities in the stress experienced at the edges where the elastomeric material 21 is bonded to the outside surface 24 of the inner cylinder and the inside surface 23 of the outer cylinder.

The particular embodiment of the shock-absorbing joint of the present invention, as depicted in FIG. 3 as shock-absorbing joint 15, is particularly useful in the particular embodiment of the shock-absorbing assembly 13 depicted in FIG. 4 and the lower portion of FIG. 2. In particular, such a shock-absorbing assembly comprises a first shock-absorbing joint 27, a second shock-absorbing joint 28, and a third shock-absorbing joint 29, each of which is of the configuration of that depicted in FIG. 3 for shock-absorbing joint 15. In particular, as most clearly seen in FIG. 4, the outer cylinder pivot member of the first shock-absorbing joint 27 and the outer cylinder pivot member of the second shock-absorbing joint 28 form a common first articulating arm 30 which links the first and second shock-absorbing joints. The inner cylinder pivot member of the second shock-absorbing joint 28 and the inner cylinder pivot member of the third shock-absorbing joint 29 form a common second articulating arm 31 which links the second and third shock-absorbing joints.

The second articulating arm 31 has a first plate 32 with one extremity rigidly affixed to one end of the inner cylinder of the second shock-absorbing joint 28 and its other extremity rigidly affixed to one end of the inner cylinder of the third shock-absorbing joint 29. The second articulating arm 31 also has a second plate 33 with one extremity rigidly affixed to the opposite end of the inner cylinder of the second shock absorbing joint 28 and its other extremity rigidly affixed to the opposite end of the inner cylinder of third shock absorbing joint. This arrangement permits unobstructed rotation of the second articulating arm 31 relative to the first articulating arm 30. This aspect can also be seen from the detail of FIG. 3 wherein the inner cylinder pivot member 16 comprises two plates rigidly affixed at opposite ends of inner cylinder 18 so that the outer cylinder pivot member 17 is capable of unobstructed rotation with respect to inner cylinder pivot member 16.

As further indicated in the detail of FIG. 4, the shock-absorbing assembly 13 is adapted for mounting on the structure to be protected thereby and for having a bumper assembly rigidly affixed thereto. In particular, the inner cylinder pivot member of the first shock-absorbing joint 27 may be further adapted for rigidly mounting to a structure, such as platform leg 11, to be protected by the shock absorbing assembly. In the embodiment of FIG. 4, this is accomplished by means of structure mounting 37 which is rigidly affixed to each of the two plates of the inner cylinder pivot member 34 of the first shock-absorbing joint 27. The outer cylinder pivot member 35 of the third shock-absorbing joint 29 is adapted for rigidly affixing bumper assembly 12 thereto by means of bumper assembly mounting 38.

The general functioning of the shock-absorbing assembly 13 of the present invention can best be seen in FIG. 2 by comparing the lower portion shock-absorbing assembly with unloaded angle $\alpha$ between articulating arms 30 and 31 and the fully loaded angle $\beta$ between the articulating arms 30 and 31 in the upper portion of FIG. 2 which shows the shock-absorbing assembly in the fully loaded position immediately prior to the spring action of the elastomeric material which pushes bumper element 12 back into its original place prior to imposition of the shock force.

It is to be understood that the particular configuration of the embodiment of the shock-absorbing assembly of the present invention as depicted in FIGS. 2 and 4 can be varied in a number of ways without departing from the basic shock-absorbing assembly of the present invention. For instance, a different alternating series of inner and outer cylinder pivot members may be employed to form the first and second articulating arms. In particular, the first articulating arm linking the first and second shock-absorbing joints can be formed by the inner cylinder pivot members of the first and second shock-absorbing joints. In such a circumstance, the second articulating arm linking the second and third shock-absorbing joints would be formed by the outer cylinder pivot members of the second and third shock-absorbing joints. Also in this alternate variation of the basic shock-absorber assembly 13, the outer cylinder pivot means of the first shock-absorbing joint would be further adapted for rigidly mounting to a structure to be protected by the shock-absorbing assembly, and the inner cylinder pivot member of the third shock-absorbing joint would be further adapted for rigidly affixing a bumper assembly thereto.

It should be understood that a shock-absorbing assembly of the same general configuration as that of shock absorber assembly 13 in FIG. 2 and 4 could be provided with only one or two shock absorbing joints instead of three. In such configurations there would be two articulating arms such as 30 and 31 in FIGS. 2 and 4 and three separate pivot axes as shown in FIG. 2. To be useful as a shock-absorbing assembly, however, such a configuration with only one or only two shock-absorbing joints would necessarily have to be a "balanced" system, i.e., one with no inherent tendency to climb, drift, or otherwise significantly move in the absence of shock forces. One possibility would be to have two shock-absorbing joints in the place where the first shock-absorbing joint 27 and the third shock-absorbing joint 29 appear in shock-absorbing assembly 13 of FIG. 2. In place of the middle shock-absorbing joint 28 would be a conventional bearing mechanism allowing rotation of articulating arms 30 and 31. In another configuration containing only one shock-absorbing joint, such shock-absorbing joint would be in the same position as the middle shock-absorbing joint 28 of shock-absorbing assembly 13. In place of the first and third shock-absorbing joints 20, 27 and 29, there would be provided conventional bearings allowing the rotation of articulating arm 30 relative to pivot member 34 and the rotation of articulating arm 31 relative to pivot member 35. One disadvantage of the particular embodiments described above using conventional bearings is that such bearings would be susceptible to wear and corrosion problems present in the corrosive marine environment.

Depicted in FIGS. 5 and 6 is an alternate embodiment of the shock-absorbing assembly of the present invention. Shock-absorbing assembly 40, two of which are depicted in FIG. 5 as supporting bumper element 12 in protection of platform leg 11 is similar in many respects to the embodiment represented by shock-absorbing assembly 13 in FIG. 2. The first shock-absorbing joint 41 and the second shock-absorbing joint 42 of the shock-absorbing assembly 40 are very similar in configuration to each of the individual shock-absorbing joints 27, 28 and 29 of shock absorbing assembly 13.

In the shock-absorbing assembly 40, the outer cylinder pivot member of the first shock-absorbing joint 41 and the outer cylinder pivot member of the second shock-absorbing joint 42 form a common or curved articulating arm 43 linking the first and second shock-absorbing joints. The inner cylinder pivot member of the first shock-absorbing joint 41 has a first and second plate 44 and 45 each of which are rigidly affixed to the inner cylinder of the first shock-absorbing joint. The inner cylinder pivot member of the second shock-absorbing joint also has a first and second plate 46 and 47 rigidly affixed to opposite ends of its inner cylinder. This arrangement permits the unobstructed rotation of the curved articulating arm 43 relative to the inner cylinder pivot members of the first and second shock-absorbing joints 41 and 42.

As depicted in FIGS. 5 and 6, the first and second plates 44 and 45 of the inner cylinder pivot member of the first shock-absorbing joint may be further adapted for rigidly mounting to a structure such as platform leg 11 that is being protected by the shock-absorbing assembly. Also, the first and second plates 46 and 47 of the inner cylinder pivot member of the second shock-absorbing joint 42 may be further adapted for affixing a bumper assembly, such as bumper element 12, thereto.

Unlike the embodiment depicted in FIGS. 2 and 4, the shock-absorbing assembly 40 must contain two shock-absorbing joints 41 and 42. Otherwise, the shock-absorbing assembly would have an inherent tendency to creep or move even in the absence of shock forces. The articulating arm 43 is curved to reduce the extent to which shock-absorbing assembly 40 would protrude from platform leg 11 when providing a given amount of cushioning capacity. The basic design encompassed in the shock-absorbing assembly embodiment of FIGS. 5 and 6 is such that curved articulating arm 43 preferably moves in a substantially horizontal plane. This mode of operation is to be contrasted with the embodiment depicted in FIGS. 2 and 4. In that embodiment of the shock-absorbing assembly articulating arms 30 and 31 move substantially completely in a vertical plane. For applications in which the expected shock forces have more significant vertical vectors, the embodiment of FIGS. 2 and 4 would probably be preferred.

Figure 8:
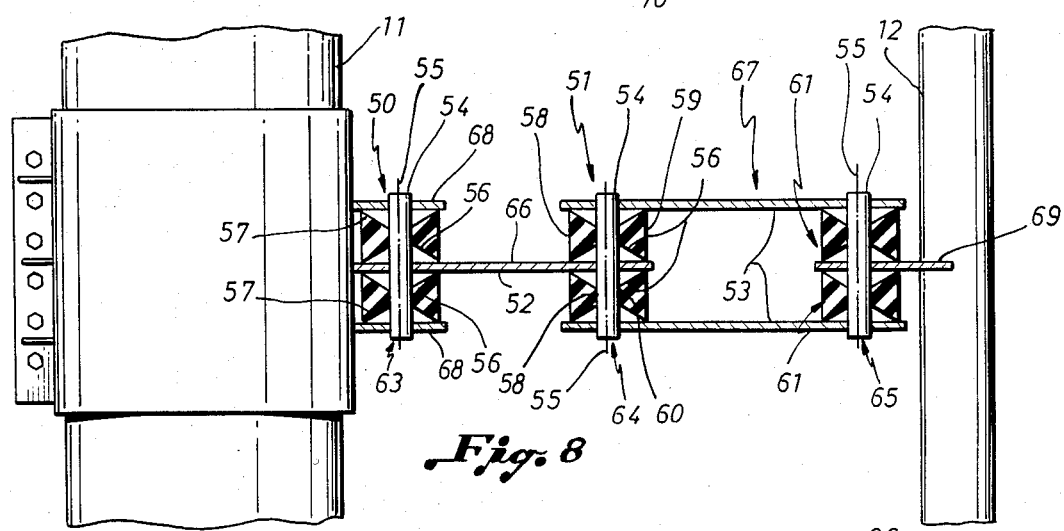
FIG. 8 is a side elevational view of a shock-absorbing assembly incorporating an alternate embodiment of the shock-absorbing joint of the present invention.
Figures 7A, 7B, 7C:
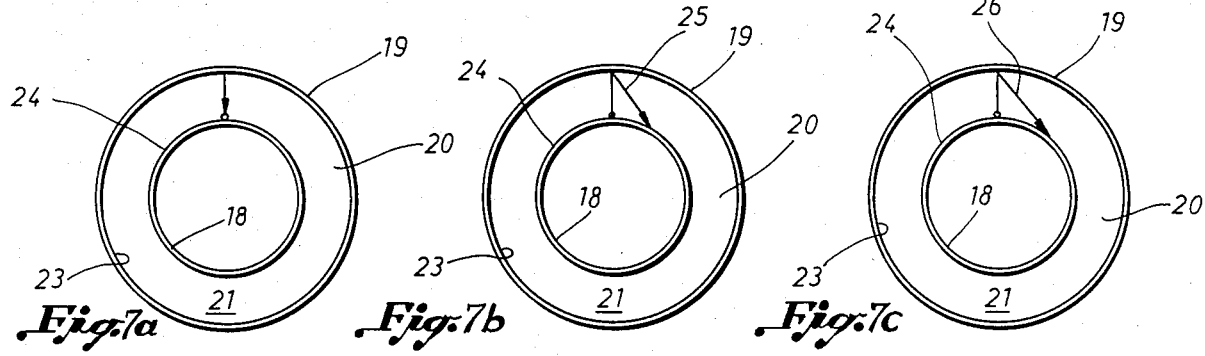
FIGS. 7a, 7b, and 7c are three cross-sectional views of the cylinder portions of the basic shock-absorbing joint used in the shock-absorbing assemblies depicted in FIGS. 2-6, depicting the elastomeric material within the shock-absorbing joint in the unloaded, half-loaded, and fullyloaded state.

FIG. 8 depicts not only an alternate embodiment 51 of the shock-absorbing assembly of the present invention but also an alternate embodiment 50 of the shock-absorbing joint of the present invention. Looking at the middle one of the three shock-absorbing joints in shock-absorbing assembly 51, there is seen that the first pivot member of a shock-absorbing joint 50 is an inner pivot plate 52. The second pivot member comprises a pair of outer pivot plates 53 that are substantially parallel to and substantially equidistant from inner pivot plate 52 on opposite sides thereof.

The mounting base onto which the elastomeric material is bonded includes a pivot support shaft 54 and an inner pair of circular slanted bonding surfaces 56. The pivot support shaft 54 has the common pivot axis 55 as its axis and is rigidly affixed to and passes through inner pivot plate 52 at the approximate longitudinal mid-point of the pivot support shaft 54. One of the inner pair of circular slanted bonding surfaces 56 is attached to each side of inner pivot plate 52, and the pivot support shaft 54 passes through the inner pair of circular slanted bonding surfaces 56.

The second mounting base onto which the elastomeric material is bonded includes an outer pair of circular slanted bonding surfaces 57, one rigidly affixed to the inside face of each of the outer pivot plates 53. Pivot support shaft 54 passes through the outer pair of circular slanted bonding surfaces 57 and the pair of outer pivot plates 53 but is not attached to either. The body of elastomeric material substantially fills two annular spaces 58 of thicker outer circumference 59 and thinner inner circumference 60. The annular spaces 58 are each formed by a bonding surface of the inner pair of circular slanted bonding surfaces 56 and the corresponding bonding surface of the outer pair of circular slanted bonding surfaces 57 that is nearer thereto.

A variation of the embodiment of the shock-absorbing joint 50 described above can be accomplished by having pivot support shaft 54 rigidly affixed to the outer pivot plates 53 instead of the inner pivot plate 52. Either variation will give suitable results but the pivot support shaft 54 may not be rigidly affixed to both the inner pivot plate 52 and the outer pivot plates 53. With respect to the frustoconical cross-sectional rings of elastomeric material, the application of shock force to a shock-absorbing joint 50 causes rotation of the inner pivot plate 52 relative to the outer pivot plates 53 such that the elastomeric material is distorted by torque. The distortion in this embodiment is somewhat different, however, from that of the shock-absorbing joint 15 depicted in detail in FIG. 3. In particular, the torque distortion of the elastomeric material in shock-absorbing joint 50 is in the nature of a torsional stressing of one side of ring 61 relative to the other side. But the advantage of having no shear line discontinuity at the point where the elastomeric material is first bonded to the mounting base is as much a part of the embodiment shown as shock-absorbing joint 50 as it is in the embodiment comprising the inner and outer cylinders as in FIG. 3. The thicker outer circumference 59 and the thinner inner circumference 60 are employed in shock-absorbing joint 50 in order to accommodate the torsional forces so that the elastomeric material making up ring 61 experience uniform stressing throughout.

The shock-absorbing joint 50 can be used to form shock-absorbing assembly 51 as depicted in FIG. 8, which assembly comprises a first shock-absorbing joint 63, a second shock-absorbing joint 64, and a third shock-absorbing joint 65. The inner pivot plate of the first shock-absorbing joint 63 and the inner pivot plate of the second shock-absorbing joint 64 form a single co-extensive plate providing a first articulating arm 66 linking the first and second shock-absorbing joints. Each outer pivot plate of the second shock-absorbing joint 64 and the corresponding outer pivot plate of the third shock-absorbing joint 65 form a single co-extensive plate. The pair of co-extensive plates thus formed provide a second articulating arm 67 linking the second and third shock-absorbing joint 64 and 65. The outer pivot plates 68 of the first shock-absorbing joint 63 may be further adapted for rigidly mounting of the shock-absorbing assembly 51 to the structure, such as platform leg 11 to be protected by the assembly. The inner pivot plate 69 of the third shock-absorbing joint 65 may be further adapted for rigidly affixing a bumper assembly, such as bumper element 12, thereto.

All of the various embodiments of the shock-absorbing assembly of the present invention may be used in a variety of different configurations to provide a number of different forms of complete fender systems to protect structures such as offshore platform legs. An example of such a complete fender system is that depicted in FIG. 9. FIG. 9 employs two shock-absorbing assemblies 51 rigidly affixed to platform leg 11. Each of the shock-absorbing assemblies have their third shock-absorbing joint 65 rotatably embedded within a semicircular fender 70 encompassing a substantial portion of the area surrounding platform leg 11. Embedded within semicircular fender 70 are individual cushioning bumper elements 71. As can be seen from the depiction of FIG. 9 the overall fender system can provide protection to platform 11 from sudden shock forces coming from a wide range of directions.

For both of the embodiments of the shock-absorbing joint of the present invention, any suitable elastomeric material may be used. Examples of such materials are natural rubber, polyurethane, and similar materials with comparable elastomeric properties. For most applications of the present invention, natural rubber is probably the preferred elastomeric material. The elastomeric material is molded and bonded into place onto the symmetrical surfaces of the first and second mounting bases in accord with conventional methods of molding and bonding. These methods and the materials used therein to effect adequate bonding between the elastomeric material and the surfaces of the mounting bases are well-known to those skilled in this art.

For the embodiment of the shock-absorbing joint of the present invention wherein the first and second mounting bases are an inner and outer cylinder, there is a preferred molding process for filling the annular space between the inner and outer cylinders with elastomeric material. Though it is possible to mold the elastomeric material in place between the two different diameter cylinders in a single step, the preferred method would entail producing a plurality of individual shock-absorbing segments to fill the annular space between the inner and outer cylinders. The general principles respecting this molding process are taught in the context of assembling an axial load cell by Landers et al. in U.S. Pat. No. 4,084,801, which is hereby incorporated by reference.

Individual shock-absorbing segments may be produced prior to assembly into a shock-absorbing joint of the present invention. Opposite surfaces of an individual block of elastomeric material would be bonded to curved plates to produce such a segment. The curved plates of each segment would then be rigidly affixed to the inside surface of the outer cylinder and the outside surface of the inner cylinder, respectively. Alternatively, one surface of each individual block of elastomeric material would be bonded to the outside surface of the inner cylinder, and the opposite surface would then be bonded to a curved plate, which in turn would be rigidly affixed to the inside surface of the outer cylinder.

The foregoing description has been directed to particular embodiments of the invention in accordance with the requirements of the Patent Statutes for the purposes of illustration and explanation. It will be apparent, however, to those skilled in this art that many modifications and changes in the apparatus and the procedure set forth will be possible without departing from the scope and spirit of the invention. It is intended that the following claims be interpreted to embrace all such modifications and changes.

What is claimed is:
1. A shock-absorbing joint comprising:
an inner pivot plate;
a pair of outer pivot plates generally parallel to and generally equidistant from the inner pivot plate on opposite sides thereof, the pair of outer pivot plates forming an unloaded angle with the inner pivot plate and being rotatable relative to the inner pivot plate by pivoting about a common pivot axis formed by the unloaded angle;
a first and second mounting base rigidly affixed to the inner pivot plate and to the pair of outer pivot plates, respectively, the first and second mounting bases being rotatable relative to each other about the common pivot axis,
the first mounting base including
a pivot support shaft with the common pivot axis as its axis, the pivot support shaft being rigidly affixed to and passing through the inner pivot plate, and
an inner pair of generally symmetrical bonding surfaces, one rigidly affixed to each side of the inner pivot plate, the pivot support shaft passing through the inner pair of bonding surfaces,
the second mounting base including an outer pair of generally symmetrical bonding surfaces, one rigidly affixed to the inside face of each of the outer pivot plates, the pivot support shaft passing through the outer pair of bonding surfaces and the pair of outer pivot plates but not being attached to either; and
a body of elastomeric material bonded to the generally symmetrical bonding surfaces of the first and second mounting bases, so that a shock force received by either the inner pivot plate or the pair of outer pivot plates causes rotation of one relative to the other to form a loaded angle between the inner pivot plate and the pair of outer pivot plates smaller than the unloaded angle, which rotation causes the elastomeric material to be distorted by torque and to absorb rotational shear force resulting from the torque by elastomeric spring action returning the inner pivot plate and the pair of outer pivot plates to their relative position with the unloaded angle therebetween.

2. The shock-absorbing joint of claim 1 wherein the symmetrical bonding surfaces are generally circular and slanted and the body of elastomeric material generally fills two annular spaces of increasing thickness radially from the pivot support shaft, each annular space being formed by a bonding surface of the inner pair of circular slanted bonding surfaces and the corresponding bonding surface of the outer pair of circular slanted bonding surfaces nearer thereto.

3. The shock-absorbing joint of claim 2 wherein the pivot support shaft is rigidly affixed to and passes through the inner pivot plate at the approximate longitudinal midpoint of the pivot support shaft.

4. A shock-absorbing joint comprising:
   an inner pivot plate;
   a pair of outer pivot plates generally parallel to and generally equidistant from the inner pivot plate on opposite sides thereof, the pair of outer pivot plates forming an unloaded angle with the inner pivot plate and being rotatable relative to the inner pivot plate by pivoting about a common pivot axis formed by the unloaded angle;
   a first and a second mounting base rigidly affixed to the inner pivot plate and to the pair of outer pivot plates, respectively, the first and second mounting bases being rotatable relative to each other about the common pivot axis,
   the first mounting base including an inner pair of generally symmetrical bonding surfaces, one rigidly affixed to each side of the inner pivot plate,
   the second mounting base including
      a pivot support shaft with the common pivot axis as its axis, the pivot support shaft being rigidly affixed to and passing through each outer pivot plate, the pivot support shaft also passing through the inner pivot plate and the inner pair of bonding surfaces but not being attached to either; and
      an outer pair of generally symmetrical bonding surfaces, one rigidly affixed to the inside face of each outer pivot plate, the pivot support shaft passing through the outer pair of bonding surfaces; and
   a body of elastomeric material bonded to the generally symmetrical bonding surfaces of the first and second mounting bases, so that a shock force received by either the inner pivot plate or the pair of outer pivot plates causes rotation of one relative to the other to form a loaded angle between the inner pivot plate and the pair of outer pivot plates smaller than the unloaded angle, which rotation causes the elastomeric material to be distorted by torque and to absorb rotational shear force resulting from the torque by elastomeric spring action returning the inner pivot plate and the pair of outer pivot plates to their relative position with the unloaded angle therebetween.

5. The shock-absorbing joint of claim 4 wherein the symmetrical bonding surfaces are generally circular and slanted and the body of elastomeric material generally fills two annular spaces of increasing thickness radially from the pivot support shaft, each annular space being formed by a bonding surface of the inner pair of circular slanted bonding surfaces and the corresponding bonding surface of the outer pair of circular slanted bonding surfaces nearer thereto.

6. The shock-absorbing joint of claim 5 wherein the pivot support shaft passes through the inner pivot plate at the approximate longitudinal midpoint of the pivot support shaft.

7. A shock-absorbing assembly comprising:
   a first shock-absorbing joint including
      an inner pivot plate;
      a pair of outer pivot plates generally parallel to and generally equidistant from the inner pivot plane on opposite sides thereof, the pair of outer pivot plates forming an unloaded angle with the inner pivot plate and being rotatable relative to the inner pivot plate by pivoting about a common pivot axis formed by the unloaded angle;
      a first and a second mounting base rigidly affixed to the inner pivot plate and to the pair of outer pivot plates, respectively, the first and second mounting bases being rotatable relative to each other about the common pivot axis,
      the first mounting base including
         a pivot support shaft with the common pivot axis as its axis, the pivot support shaft being rigidly affixed to and passing through the inner pivot plate, and
         an inner pair of generally symmetrical bonding surfaces, one rigidly affixed to each side of the inner pivot plate, the pivot support shaft passing through the inner pair of bonding surfaces,
      the second mounting base including an outer pair of generally symmetrical bonding surfaces, one rigidly affixed to the inside face of each of the outer pivot plates, the pivot support shaft passing through the outer pair of bonding surfaces and the pair of outer pivot plates but not being attached to either; and
      a body of elastomeric material bonded to the generally symmetrical bonding surfaces of the first and second mounting bases, so that a shock force received by either the inner pivot plate or the pair of outer pivot plates causes rotation of one relative to the other to form a loaded angle between the inner pivot plate and the pair of outer pivot plates smaller than the unloaded angle, which rotation causes the elastomeric material to be distorted by torque and to absorb rotational shear force resulting from the torque by elastomeric spring action returning the inner pivot plate and the pair of outer pivot plates to their relative position with the unloaded angle therebetween;
   a second shock-absorbing joint with the same features as the first shock-absorbing unit; and
   a third shock-absorbing joint with the same features as the first shock-absorbing joint;
   wherein
   each outer pivot plate of the first shock-absorbing joint and a corresponding outer pivot plate of the second shock-absorbing joint form a single coaxtensive plate, the pair of coextensive plates forming a first articulating arm linking the first and second shock-absorbing joints, and
   the inner pivot plate of the second shock-absorbing joint and the inner pivot plate of the third shock-absorbing joint form a single coextensive plate providing a second articulating arm linking the second and third shock-absorbing joints.

8. A shock-absorbing assembly comprising:
   a first shock-absorbing joint including
      an inner pivot plate;
      a pair of outer pivot plates generally parallel to and generally equidistant from the inner pivot plate on opposite sides thereof, the pair of outer pivot plates forming an unloaded angle with the inner pivot plate and being rotatable relative to the inner pivot plate by pivoting about a common pivot axis formed by the unloaded angle;

a first and a second mounting base rigidly affixed to the inner pivot plate and to the pair of outer pivot plates, respectively, the first and second mounting bases being rotatable relative to each other about the common pivot axis, the first mounting base including an inner pair of generally symmetrical bonding surfaces, one rigidly affixed to each side of the inner pivot plate, the second mounting base including a pivot support shaft with the common pivot axis as its axis, the pivot support shaft being rigidly affixed to and passing through each outer pivot plate, the pivot support shaft also passing through the inner pivot plate and the inner pair of bonding surfaces but not being attached to either; and an outer pair of generally symmetrical bonding surfaces, one rigidly affixed to the inside face of each outer pivot plate, the pivot support shaft passing through the outer pair of bonding surfaces; and a body of elastomeric material bonded to the generally symmetrical bonding surfaces of the first and second mounting bases, so that a shock force received by either the inner pivot plate or the pair of outer pivot plates causes rotation of one relative to the other to form a loaded angle between the inner pivot plate and the pair of outer pivot plates smaller than the unloaded angle, which rotation causes the elastomeric material to be distorted by torque and to absorb rotational shear force resulting from the torque by elastomeric spring action returning the inner pivot plate and the pair of outer pivot plates to their relative position with the unloaded angle therebetween;

a second shock-absorbing joint with the same features as the first shock-absorbing unit; and a third shock-absorbing joint with the same features as the first shock-absorbing unit;

wherein each outer pivot plate of the first shock-absorbing joint and a corresponding outer pivot plate of the second shock-absorbing joint form a single coextensive plate, the pair of coextensive plates forming a first articulating arm linking the first and second shock-absorbing joints, and the inner pivot plate of the second shock-absorbing joint and the inner pivot plate of the third shock-absorbing joint form a single coextensive plate porviding a second articulating arm linking the second and third shock-absorbing joints.

9. The shock-absorbing assembly of claim 7 or 8 wherein:

the inner pivot plate of the first shock-absorbing joint is further adapted for rigidly mounting to a structure to be protected by the shock-absorbing assembly, and the outer pivot plates of the third shock-absorbing joint are further adapted for rigidly affixing a bumper assembly thereto.

10. A shock-absorbing assembly comprising:

a first shock-absorbing joint including an inner pivot plate;

a pair of outer pivot plates generally parallel to and generally equidistant from the inner pivot plane on opposite sides thereof, the pair of outer pivot plates forming an unloaded angle with the inner pivot plate and being rotatable relative to the inner pivot plate by pivoting about a common pivot axis formed by the unloaded angle;

a first and a second mounting base rigidly affixed to the inner pivot plate and to the pair of outer pivot plates, respectively, the first and second mounting bases being rotatable relative to each other about the common pivot axis, the first mounting base including a pivot support shaft with the common pivot axis as its axis, the pivot support shaft being rigidly affixed to and passing through the inner pivot plate, and an inner pair of generally symmetrical bonding surfaces, one rigidly affixed to each side side of the inner pivot plate, the pivot support shaft passing through the inner pair of bonding surfaces, the second mounting base including an outer pair of generally symmetrical bonding surfaces, one rigidly affixed to the inside face of each of the outer pivot plates, the pivot support shaft passing through the outer pair of bonding surfaces and the pair of outer pivot plates but not being attached to either; and a body of elastomeric material bonded to the generally symmetrical bonding surfaces of the first and second mounting bases, so that a shock force received by either the inner pivot plate or the pair of outer pivot plates causes rotation of one relative to the other to form a loaded angle between the inner pivot plate and the pair of outer pivot plates smaller than the unloaded angle, which rotation causes the elastomeric material to be distorted by torque and to absorb rotational shear force resulting from the torque by elastomeric spring action returning the inner pivot plate and the pair of outer pivot plates to their relative position with the unloaded angle therebetween;

a second shock-absorbing joint with the same features as the first shock-absorbing unit; and a third shock-absorbing joint with the same features as the first shock-absorbing joint;

wherein the inner pivot plate of the first shock-absorbing joint and the inner pivot plate of the second shock-absorbing joint form a sinlge coextensive plate providing a first articulating arm linking the first and second shock-absorbing joints, and each outer pivot plate of the second shock-absorbing joint and a corresponding outer pivot plate of the third shock-absorbing joint form a single coextensive plate, the pair of coextensive plates forming a second articulating arm linking the second and third shock-absorbing joints.

11. A shock-absorbing asembly comprising:

a first shock-absorbing joint including an inner pivot plate;

a pair of outer pivot plates generally parallel to and generally equidistant from the inner pivot plate on opposite sides thereof, the pair of outer pivot plates forming an unloaded angle with the inner pivot plate and being rotatable relative to the inner pivot plate by pivoting about a common pivot axis formed by the unloaded angle;

a first and a second mounting base rigidly affixed to the inner pivot plate and to the pair of outer pivot plates, respectively, the first and second mounting bases being rotatable relative to each other about the common pivot axis, the first mounting base including an inner pair of generally symmetrical bonding surfaces, one rigidly affixed to each side of the inner pivot plate, the second mounting base including
- a pivot support shaft with the common pivot axis as its axis, the pivot support shaft being rigidly affixed to and passing through each outer pivot plate, the pivot support shaft also passing through the inner pivot plate and the inner pair of bonding surfaces but not being attached to either; and
- an outer pair of generally symmetrical bonding surfaces, one rigidly affixed to the inside face of each outer pivot plate, the pivot support shaft passing through the outer pair of bonding surfaces; and a body of elastomeric material bonded to the generally symmetrical bonding surfaces of the first and second mounting bases, so that a shock force received by either the inner pivot plate or the pair of outer pivot plates causes rotation of one relative to the other to form a loaded angle between the inner pivot plate and the pair of outer pivot plates smaller than the unloaded angle, which rotation causes the elastomeric material to be distorted by torque and to absorb rotational shear force resulting from the torque by elastomeric spring action returning the inner pivot plate and the pair of outer pivot plates to their relative position with the unloaded angle therebetween;

a second shock-absorbing joint with the same features as the first shock-absorbing unit; and a third shock-absorbing joint with the same features as the first shock-absorbing unit;

wherein the inner pivot plate of the first shock-absorbing joint and the inner pivot plate of the second shock-absorbing joint form a single coextensive plate providing a first articulating arm linking the first and second shock-absorbing joints, and each outer pivot plate of the second shock-absorbing joint and a corresponding outer pivot plate of the third shock-absorbing joint form a single coextensive plate, the pair of coextensive plates forming a second articulating arm linking the second and third shock-absorbing joints.

12. The shock-absorbing assembly of claim 10 or 11 wherein:

the outer pivot plates of the first shock-absorbing joint are further adapted for rigidly mounting to a structure to be protected by the shock-absorbing assembly, and the inner pivot plate of the third shock-absorbing joint is further adapted for rigidly affixing a bumper assembly thereto.

* * * * *